(12) United States Patent
Moyano et al.

(10) Patent No.: US 10,840,953 B2
(45) Date of Patent: Nov. 17, 2020

(54) COATED ARTICLES DEMONSTRATING ELECTROMAGNETIC RADIATION TRANSPARENCY AND METHOD OF MITIGATING CONTAMINANT BUILD-UP ON A SUBSTRATE

(71) Applicant: PPG INDUSTRIES OHIO, INC., Cleveland, OH (US)

(72) Inventors: Daniel F. Moyano, Allison Park, PA (US); Shanti Swarup, Allison Park, PA (US); Matthew S. Luchansky, Wexford, PA (US); Xiangling Xu, Pittsburgh, PA (US); Kristen Kruszewski, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 75 days.

(21) Appl. No.: 16/038,505

(22) Filed: Jul. 18, 2018

(65) Prior Publication Data
US 2020/0028528 A1    Jan. 23, 2020

(51) Int. Cl.
| | | |
|---|---|---|
| H04B 1/03 | (2006.01) | |
| C09D 133/10 | (2006.01) | |
| C08K 5/00 | (2006.01) | |
| C08K 5/09 | (2006.01) | |
| C08K 5/29 | (2006.01) | |
| C08L 83/04 | (2006.01) | |

(52) U.S. Cl.
CPC ............. *H04B 1/03* (2013.01); *C09D 133/10* (2013.01); *C08K 5/0025* (2013.01); *C08K 5/09* (2013.01); *C08K 5/29* (2013.01); *C08L 83/04* (2013.01)

(58) Field of Classification Search
CPC ............................ C09D 133/08; C09D 133/10
See application file for complete search history.

(56) References Cited

U.S. PATENT DOCUMENTS

| | | | |
|---|---|---|---|
| 6,184,842 B1 | 2/2001 | Leinweber et al. | |
| 7,342,551 B2 | 3/2008 | King | |
| 8,702,135 B2 | 4/2014 | Gaboury et al. | |
| 8,785,556 B2 | 7/2014 | Brown | |
| 9,187,670 B1 | 11/2015 | Schwendeman et al. | |
| 9,190,709 B2 | 11/2015 | Grice et al. | |
| 9,334,404 B2 | 5/2016 | Simpson et al. | |
| 9,429,533 B2 | 8/2016 | Larson-Smith et al. | |
| 9,574,089 B2 | 2/2017 | Klein | |
| 9,735,466 B2 | 8/2017 | Johnson et al. | |
| 2010/0069551 A1* | 3/2010 | Minge ................. | C08F 283/124 524/406 |
| 2011/0082254 A1 | 4/2011 | Sepeur et al. | |
| 2013/0089731 A1* | 4/2013 | Imanaka ................. | B05D 7/14 428/336 |
| 2014/0049427 A1 | 2/2014 | Keckes et al. | |
| 2014/0364542 A1 | 12/2014 | Flosbach et al. | |
| 2015/0240085 A1* | 8/2015 | Klein .................... | C09D 133/16 416/241 R |
| 2015/0353663 A1* | 12/2015 | Liu ........................ | C08F 226/08 424/60 |
| 2016/0258168 A1* | 9/2016 | Lee ........................... | C08J 5/047 |
| 2017/0355875 A1 | 12/2017 | Klein et al. | |
| 2017/0355876 A1 | 12/2017 | Klein et al. | |

FOREIGN PATENT DOCUMENTS

| | | |
|---|---|---|
| EP | 2785758 B1 | 10/2015 |
| WO | 9927025 | 6/1999 |
| WO | WO 2013/081815 A1 | 6/2013 |
| WO | WO 2013/081816 A1 | 6/2013 |
| WO | WO 2013/081892 A1 | 6/2013 |
| WO | WO 2017/202692 | 11/2017 |

* cited by examiner

*Primary Examiner* — Michael M Dollinger
(74) *Attorney, Agent, or Firm* — Krisanne Shideler

(57) ABSTRACT

The present invention is directed to coated articles demonstrating a transmission of electromagnetic radiation having a frequency of 22 to 81 GHz in the range of 70% to 100%. The articles comprise substrates coated with curable film-forming compositions comprising a first film-forming polymer prepared from at least one hydrophobic monomer, a second film-forming polymer prepared from at least one hydrophobic monomer, and a curing agent. Upon application of the curable film-forming composition to the substrate to form a coating layer, the first film-forming polymer is distributed throughout the coating layer, and the concentration of the second film-forming polymer is greater at the surface of the coating layer than the concentration of the second film-forming polymer within the bulk of the coating layer. The present invention is also drawn to methods of mitigating contaminant build-up on a substrate using the curable film-forming compositions described above.

13 Claims, No Drawings

COATED ARTICLES DEMONSTRATING ELECTROMAGNETIC RADIATION TRANSPARENCY AND METHOD OF MITIGATING CONTAMINANT BUILD-UP ON A SUBSTRATE

FIELD OF THE INVENTION

The present invention relates to coated articles demonstrating transparency to electromagnetic radiation having a frequency of 22 to 81 GHz, and methods of mitigating dirt build-up on substrates.

BACKGROUND OF THE INVENTION

Recent advances have been made in technologies related to self-driving ("autonomous") vehicles and other objects in a vehicle's surroundings including markings that are detectable by a sensor mounted on the autonomous vehicle. Autonomous vehicles use a combination of detecting systems, such as sensors, cameras, radar, ultrasonic, and lasers to detect and locate obstacles such that the autonomous vehicle can safely navigate around such objects. Some detecting systems are limited in their ability to detect objects at long distances or in non-ideal environments, such as in inclement weather or due to build-up of dirt and other contaminants, including ice and water in the form of droplets, rivulets, or sheets on detecting system surfaces. Such limitations may prohibit the autonomous vehicle from safely navigating obstacles. Easy cleaning of coated surfaces is a significant selling point for the autonomous vehicle market, as well as many other industries, in both consumer and industrial markets.

Easy removal of dirt or other contaminants and prevention of contaminant build-up are desirable properties for products such as automobiles and autonomous vehicles. Environmental contaminants such as tar, asphalt, animal droppings, road salt, detergents, and the like may damage the surface of coated vehicles, architectural surfaces, and other industrial substrates. Damage may be caused by a chemical reaction of the contaminant with the coated surface such as by chemical etching, or may involve physical removal of part or all of the coating from the substrate (i. e., "cohesive failure") upon removal of the contaminant during cleaning. Cohesive failure may also involve incomplete removal of the contaminant from the coated surface during cleaning.

The use of hydrophobic acrylates as additives has been the main approach to yield easy-to-clean ("E2C") coatings such as automotive clearcoats. However, incompatibility of conventional film-forming binders, which tend to be hydrophilic, and the hydrophobic additives limits the applicability of this approach, because stratification of the materials upon application to a substrate leads to irregular distribution of the hydrophobic additive as well as an undesirable increase of haze. Additionally, short duration of the contaminant mitigation properties of current E2C compositions, due to poor durability, has limited their use.

It would be desirable to provide coated articles demonstrating transparency to electromagnetic radiation and methods of mitigating contaminant build-up on a substrate in order to overcome the disadvantages of the prior art.

SUMMARY OF THE INVENTION

The present invention is directed to coated articles comprising:

(1) a substrate that is transparent to electromagnetic radiation having a frequency of 22 to 81 GHz; and (2) a curable film-forming composition applied to at least one surface of the substrate and cured thereon. The curable film-forming composition comprises:

(a) a first film-forming polymer prepared from at least one hydrophobic monomer and having reactive functional groups, wherein the first film-forming polymer (a) is present in the curable film-forming composition in an amount of 20 to 40 percent by weight, based on the total weight of resin solids in the curable film-forming composition;

(b) a second film-forming polymer different from the first film-forming polymer (a) and prepared from at least one hydrophobic monomer, wherein the second film-forming polymer (b) is present in the curable film-forming composition in an amount of 0.5 to 15 percent by weight, based on the total weight of resin solids in the curable film-forming composition; and (c) a curing agent comprising functional groups reactive with the reactive functional groups in (a). Upon application of the curable film-forming composition to a substrate to form a coating layer, the first film-forming polymer (a) is distributed throughout the coating layer, and a concentration of the second film-forming polymer (b) is greater within a surface region of the coating layer than a concentration of the second film-forming polymer (b) within a bulk region of the coating layer; and the coated article demonstrates a transmission of electromagnetic radiation having a frequency of 22 to 81 GHz in the range of 70% to 100%.

The present invention is also drawn to methods of mitigating contaminant build-up on a substrate that is transparent to electromagnetic radiation having a frequency of 22 to 81 GHz, comprising applying one or more coatings to at least a portion of the substrate to form a coated substrate; and heating the coated substrate to a temperature and for a time sufficient to cure all the film-forming compositions. The outermost coating layer comprises the curable film-forming composition described above.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion, such as at least 10 percent, or at least 20 percent, of the reactive groups of the composition occurs, to form a polymerizate. The polymerizable composition can also be subjected to curing conditions such that a substantially complete cure is attained (such as at least 70 percent, or at least 80 percent, or at least 90 percent up to 100 percent, of the reactive groups react) and wherein further curing results in no significant further improvement in polymer properties, such as hardness.

The various embodiments and examples of the present invention as presented herein are each understood to be non-limiting with respect to the scope of the invention.

The first film-forming polymer (a) in the curable film-forming composition used to prepare the coated article of the present invention is prepared from at least one hydrophobic monomer and has reactive functional groups. By "polymer" is meant a polymer including homopolymers and copolymers, and oligomers. By "hydrophobic" is meant that the material described as such (e. g., a monomer or polymer) has non-polar properties and has a tendency to interact with, be miscible with, or be dissolved by non-polar solvents such as alkanes and oils. By definition, a molecule may be nonpolar either when there is an equal sharing of electrons between the two atoms of a diatomic molecule or because of the symmetrical arrangement of polar bonds in a more complex molecule, such that there is no overall dipole in the molecule.

The first film-forming polymer is usually an acrylic polymer. The acrylic polymer can be prepared from a reaction mixture comprising a hydrophobic monomer and a monomer having reactive functional groups. Examples of suitable hydrophobic monomers include ethylenically unsaturated monomers such as lauryl (meth)acrylate, stearyl (meth)acrylate, 2-ethylhexyl (meth)acrylate, n-octyl (meth) acrylate, and the like. The term "(meth)acrylate" is meant to encompass acrylate and/or methacrylate molecular structures where they exist. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

The first film-forming polymer (a) often comprises an acrylic polymer prepared from a reaction mixture comprising a hydrophobic monomer, wherein the hydrophobic monomer comprises a fluorinated monomer and/or a siloxane. Suitable hydrophobic monomers comprising siloxane include ethylenically unsaturated monomers comprising polydialkylsiloxane functional groups, usually polydimethylsiloxane functional groups. Such monomers may be prepared, for example, by reacting a polydialkylsiloxane having hydroxyl end groups with an ethylenically unsaturated monomer that has functional groups reactive with hydroxyl groups, such as acid or epoxy functional groups.

Examples of suitable ethylenically unsaturated monomers comprising polydialkylsiloxane functional groups include (meth)acrylate monomers such as X-22-2426 (available from Shin-Etsu Chemical Co), MCR-M07, MCR-M11, MCR-M17, MCR-M22, MCS-M11, MFR-M15 and MFS-M15 (available from Gelest, Inc), FM-0711, FM-0721 and FM-0725 (available from JNC Corporation).

The ethylenically unsaturated monomer comprising polydialkylsiloxane functional groups typically has a weight average molecular weight of 1,000 to 30,000 Da, measured by GPC using polystyrene calibration standards, 2 PL gel MIXED-C as the column, THF as eluent at 1 ml/min and refractive index detector. The polydialkylsiloxane group is typically at least oligomeric, such that the resulting ethylenically unsaturated monomer is often a macromonomer.

The hydrophobic monomer may also (or alternatively) comprise a fluorinated monomer. Nonlimiting examples of suitable ethylenically unsaturated monomers containing fluorine include fluoroethylene, chlorotrifluoroethylene, vinylidene fluoride, and hexafluoropropylene. Other fluorinated monomers include 2,2,3,3,4,4,5,5,6,6,7,7-Dodecafluoroheptyl (meth)acrylate, 3,3,4,4,5,5,6,6,7,7,8,8,9,9,10, 10,11,11,12,12,12-Heneicosafluorododecyl (meth)acrylate, 3,3,4,4,5,5,6,6,7,7,8,8,9,9,10,10,10-Heptadecafluorodecyl (meth)acrylate, 2,2,3,3,4,4,4-Heptafluorobutyl (meth)acrylate, 2,2,3,4,4,4-Hexafluorobutyl (meth)acrylate, 1,1,1,3,3, 3-Hexafluoroisopropyl (meth)acrylate, 2,2,3,3,4,4,5,5-Octafluoropentyl (meth)acrylate, 2,2,3,3,3-Pentafluoropropyl (meth)acrylate, 1H,1H,2H,2H-Perfluorodecyl (meth)acrylate, 2,2,3,3-Tetrafluoropropyl (meth)acrylate, 3,3,4,4,5,5,6, 6,7,7,8,8,8-Tridecafluorooctyl (meth)acrylate, 2,2,2-Trifluoroethyl (meth)acrylate, and 2-[(1',1',1'-Trifluoro-2'-(trifluoromethyl)-2'-hydroxy)propyl]-3-norbornyl (meth) acrylate.

The first film-forming polymer has reactive functional groups. The term "reactive" refers to a functional group capable of undergoing a chemical reaction with itself and/or other functional groups spontaneously or upon the application of heat or in the presence of a catalyst or by any other means known to those skilled in the art. The functional groups on the first film-forming binder may be selected from at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonate, acrylate, maleic and mercaptan groups. The functional groups on the film-forming polymer are often selected so as to be reactive with those on the curing agent (c). The reactive functional groups on the first film-forming polymer are usually active hydrogen groups such as hydroxyl, carboxyl, carbamate, primary and/or secondary amine, amide, thiol, and the like as known to those skilled in the art.

Useful hydroxyl functional ethylenically unsaturated monomers include hydroxyalkyl (meth)acrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone and hydroxyalkyl (meth)acrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl (meth) acrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl (meth)acrylate is preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. (Note that these acid functional monomers may also be used in the reaction mixture to prepare the first film-forming polymer, providing acid functional reactive groups thereto.) The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 7 to 30 carbon atoms, such as butyl glycidyl ether, octyl glycidyl ether, phenyl glycidyl ether and para-(tertiary butyl) phenyl glycidyl ether. Commonly used glycidyl esters include those of the structure:

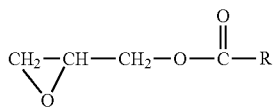

where R is a hydrocarbon radical containing from about 4 to about 26 carbon atoms. Preferably, R is a branched hydrocarbon group having from about 8 to about 10 carbon atoms, such as neopentyl, neoheptanyl or neodecanyl. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower aliphatic, cycloaliphatic, and aromatic alcohols (i.e., usually having eight or less carbon atoms) such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

The ethylenically unsaturated monomer comprising reactive functional groups is typically present in the reaction mixture that may be used to prepare the first film-forming polymer in an amount of 1 to 30, such as 1 to 20, or 1 to 10 percent by weight, based on the total weight of monomers in the reaction mixture.

One or more other polymerizable ethylenically unsaturated monomers may be included in the reaction mixture that may be used to prepare the first film-forming polymer. Useful alkyl esters of acrylic acid or methacrylic acid include aliphatic alkyl esters containing from 1 to 30, and preferably 4 to 18 carbon atoms in the alkyl group. Non-limiting examples include methyl (meth)acrylate, ethyl (meth)acrylate, and butyl (meth)acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Styrene is often used.

When used, these additional ethylenically unsaturated monomers are typically present in the reaction mixture used to prepare the acrylic polymer in an amount of 5 to 50, more often 10 to 30 percent by weight, based on the total weight of monomers in the reaction mixture.

The first film-forming polymer (a) may be prepared using known addition polymerization techniques, such as organic solution polymerization techniques, in particular from the afore-mentioned reaction mixtures. Exemplary methods are illustrated in the examples below.

The curable film-forming compositions used to prepare the coated articles of the present invention further comprise (b) a second film-forming polymer prepared from at least one hydrophobic monomer. The second film-forming polymer may be prepared from any of the monomers listed above used to prepare the first film-forming polymer. The second film-forming polymer may also have reactive functional groups such as any of those described above. In a particular example of the present invention, the second film-forming polymer (b) comprises an acrylic polymer prepared from a reaction mixture comprising a hydrophobic monomer and a monomer having a functional group reactive with the functional groups on the curing agent (c), wherein the hydrophobic monomer comprises a fluorinated monomer and/or a siloxane. However, the second film-forming polymer (b) is different from the first film-forming polymer (a). Each is prepared using monomers such that upon application of the curable film-forming composition to a substrate to form a coating layer, the first film-forming polymer is distributed throughout the coating layer with respect to a cross-section of the coating layer. That is, the concentration of the first film-forming polymer with respect to the entire coating composition is substantially consistent throughout the coating layer. Additionally, the concentration of the second film-forming polymer is greater at the surface region of the coating layer than the concentration of the second film-forming polymer within the bulk region of the coating layer. By "surface region" is meant the outermost 10% of the coating layer thickness after the coating composition is applied to a substrate. By "bulk region" is meant the remainder of the coating layer thickness under the surface region. For example, in a coating layer having a dry film thickness (DFT) of 100 microns after curing, the surface region is the outermost 10 microns of the coating layer. Thus the mass ratio of the second film-forming polymer to the first film-forming polymer is greater in the surface region of the coating layer than in the bulk of the coating layer. These distribution phenomena of the two polymers may be attained by preparing the respective film-forming polymers so that the second film-forming polymer (b) is more hydrophobic than the first film-forming polymer (a). This may be accomplished by using a higher amount of hydrophobic monomers in the preparation of the second film-forming polymer than in the first film-forming polymer. For example, in the preparation of the first film-forming polymer (a), the hydrophobic monomer is typically present in the reaction mixture in an amount of 4 to 15 percent by weight, such as 5 to 13 percent by weight, based on the total weight of monomers in the reaction mixture. In contrast, in the preparation of the second film-forming polymer (b), the hydrophobic monomer is typically present in the reaction mixture in an amount of 15 to 60 percent by weight, such as 20 to 50 percent by weight or 20 to 40 percent by weight, based on the total weight of monomers in the reaction mixture.

In addition, the amount of each polymer in the curable film-forming composition is different. Typically the first film-forming polymer (a) is present in the curable film-forming composition in an amount of at least 20 percent by weight, or at least 25 percent by weight, or at least 30 percent by weight, and at most 40 percent by weight, or at most 35 percent by weight, based on the total weight of resin solids in the curable film-forming composition. The second film-forming polymer (b) is present in the curable film-forming composition in an amount of at least 0.5 percent by weight, such as at least 1 percent by weight, and at most 15 percent by weight, or at most 10 percent by weight, based on the total weight of resin solids in the curable film-forming composition. While not intending to be bound by theory, it is believed that the distributions of the first and second film-forming polymers in a coating layer allow for an extended duration of dirt mitigation properties of the coating layer compared to coating layers that do not have such a distribution of polymers of varying hydrophobicity.

The curable film-forming compositions further comprise (c) a curing agent comprising functional groups that are reactive with the reactive functional groups in the polymer (a) and with the reactive functional groups in the polymer (b) when they are present.

The curing agent (c) used in the curable film-forming composition may be selected from one or more polyisocyanates such as diisocyanates and triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and $\alpha,\alpha,\alpha',\alpha'$-tetramethylmeta-xylylene diisocyanate.

Trifunctional isocyanates may also be used as the curing agent, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DESMODUR N 3390, which is the isocyanurate of hexamethylene diisocyanate, available from Bayer Corporation. Specifically used polyisocyanates are trimers of diisocyanates such as hexamethylene diisocyanate and isophorone diisocyanate. Desmodur Z 4470 BA, an aliphatic polyisocyanate based on isophorone diisocyanate available from Bayer Corporation, is also suitable.

The polyisocyanate may also be one of those disclosed above, chain extended with one or more polyamines and/or polyols using suitable materials and techniques known to those skilled in the art to form a polyurethane prepolymer having isocyanate functional groups.

Mixtures of aliphatic polyisocyanates are particularly suitable.

The curing agent (c) used in the curable film-forming composition may alternatively or additionally be selected from one or more aminoplast resins. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl.

Such compounds and their preparation are described in detail in U.S. Pat. No. 5,084,541.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol.

The curing agent (c) is typically present in the film-forming compositions in an amount ranging from 30 to 79.5 percent by weight, such as 40 to 65 percent by weight, often 45 to 60 percent by weight, based on the total weight of resin solids in the composition.

The curable film-forming composition used to prepare the coated articles of the present invention may further comprise (d) an additional film-forming resin component that is i) different from the first and second film-forming polymers (a) and (b); and ii) has functional groups that are reactive with at least one other component of the curable film-forming composition. Such a component (d) may comprise one or more film-forming polymers and/or curing agents.

The additional film-forming resin component (d) may comprise an addition (such as an acrylic) polymer, polyester polymer, polyurethane polymer, polyether polymer, polyester acrylate, and/or polyurethane acrylate. Often an acrylic polymer and/or polyester polymer having multiple hydroxyl functional groups is used.

Suitable acrylic polymers include copolymers of one or more monomers such as any of those disclosed above.

A polyester polymer may also be used in the additional film-forming resin component (d). Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Polyesters derived from cyclic esters such as caprolactone are also suitable. Polyester acrylates, such as acrylic polymers having polyester side chains, may also be used.

Polyurethanes can also be used in the additional film-forming resin component (d). Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Any of those disclosed above may be used in the preparation of the polyurethane. Polyurethane acrylates, such as acrylic polymers having polyurethane side chains, may also be used.

Examples of polyether polyols are polyalkylene ether polyols which include those having the following structural formula:

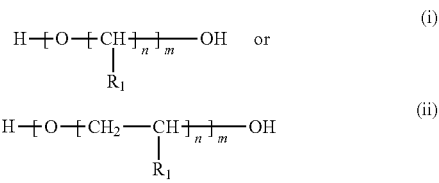

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxyethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Useful amine functional film-forming polymers include polyoxypropylene amines such as those commercially available under the trademark designation JEFFAMINE®; amine functional acrylic polymers and polyester polymers prepared as known in the art are also suitable.

The additional film-forming resin component (d) may include an aminoplast such as any of those disclosed above. In a particular example of the present invention, the additional film-forming resin component (d) comprises an acrylic and/or polyester polyol and an aminoplast.

When used, the additional film-forming resin component (d) is typically present in the film-forming compositions in an amount ranging from 30 to 49.5 percent by weight, often 35 to 45 percent by weight, based on the total weight of resin solids in the composition.

In certain examples of the present invention, the curable film-forming composition further comprises (d') a saturated fatty acid such as caprylic acid, capric acid, lauric acid, myristic acid, palmitic acid, stearic acid, arachidic acid, behenic acid, lignoceric acid, and cerotic acid; and (e) a tin-containing catalyst such as triphenyl tin hydroxide, butyl stannoic acid, dioctyltin oxide, dibutyltin dilaurate, dibutyltin diacetate, and dibutyltin oxide. Curable film-forming compositions containing fatty acids and tin-containing catalysts are particularly suitable for use on plastic substrates that require lower cure temperatures to avoid deformation.

The curable film-forming composition can additionally include a variety of optional ingredients and/or additives that are somewhat dependent on the particular application of the curable composition, such as other curing catalysts, pigments or other colorants, reinforcements, thixotropes, accelerators, surfactants, plasticizers, extenders, stabilizers, corrosion inhibitors, diluents, hindered amine light stabilizers, UV light absorbers, adhesion promoters, and antioxidants. The curable film-forming composition may be a color coat or clear coat; it may be opaque (less than 10% visible light transmittance), translucent (10 to 70% visible light transmittance), tinted transparent, or colorless transparent. The term "transparent", as used in connection with a clear coat, means that the indicated coating has the property of transmitting visible light without appreciable scattering so that objects lying beyond are entirely visible. As used herein, transparent clear coats demonstrate a visible light transmittance (% Transmission, as defined by the equation in the Examples below using visible light) of at least 70%. Additionally, the curable film-forming compositions used to prepare the coated articles of the present invention are transparent to electromagnetic radiation used in signaling devices such as transmitters and receivers for autonomous vehicles, including both short range and long range frequencies. For example, the curable film-forming compositions are typically transparent (i.e., demonstrate a % Transmission of at least 70) to electromagnetic radiation having any frequency between 22 and 81 GHz, in particular, 76 to 81 GHz.

The curable compositions used in the present invention can be prepared as a two-package composition, often curable at ambient temperature. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.). Two-package curable compositions are typically prepared by combining the ingredients immediately before use. The curable film-forming compositions may alternatively be prepared as one-package systems.

To prepare the coated articles of the present invention, the curable film-forming composition described above may be applied to at least one surface of a substrate.

Suitable substrates include any that are transparent (i. e., demonstrate a light transmittance (% Transmission, as defined in the Examples below) of at least 70%) to electromagnetic radiation having any frequency between 22 and 81 GHz, in particular, 76 to 81 GHz. For example, the curable film-forming compositions may be applied over optical substrates known in the art, including non-plastic substrates such as glass. Suitable examples of optical plastic substrates include polyol(allyl carbonate), e.g., allyl diglycol carbonates such as diethylene glycol bis(allyl carbonate), which is sold under the trademark CR-39 by PPG; polyurea-polyurethane (polyurea urethane) polymers, which are prepared, for example, by the reaction of a polyurethane prepolymer and a diamine curing agent, a composition for one such polymer being sold under the trademark TRIVEX® by PPG; polyol (meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated Bisphenol A dimethacrylate); poly (vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products. Such optical substrates may be used as lenses, screens, or covers (for transmitters, receivers, and the like) on components of autonomous vehicles.

The curable film-forming compositions may also be applied over elastomeric, plastic, or composite substrates such as those that are found on motor vehicles and used as vehicle components such as wheels, bumpers, fenders, hoods, doors, panels, etc. These vehicle parts may be formed from any of the common thermoplastic or thermosetting synthetic materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate made of fibers, typically of glass or carbon, or other filler material that is incorporated with polymeric or plastic materials, commonly of epoxy type polymers.

Before depositing any coating compositions upon the surface of the substrate, it is common practice, though not necessary, to remove foreign matter from the surface by thoroughly cleaning and degreasing the surface. Such cleaning typically takes place after forming the substrate (molding, etc.) into an end-use shape. The surface of the substrate can be cleaned by physical and/or chemical means, such as mechanically abrading the surface or cleaning/degreasing with commercially available cleaning agents which are well known to those skilled in the art.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a higher temperature or by passing the substrate between squeegee rolls.

The substrate may be a bare, cleaned surface; it may be oily, pretreated with one or more pretreatment or adhesion promoting compositions, and/or prepainted with one or more coating compositions, primers, topcoats, etc., applied by any method including, but not limited to, spraying, dip coating, roll coating, curtain coating, and the like.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-25 mils (25.4-635 microns), often 5-25 mils (127-635 microns).

The film-forming compositions can be applied directly to the surface of a substrate or onto an adhesion promoter layer, primer coat or other coating as noted above, such as a topcoat, on the substrate to form a coated substrate in accordance with the present invention. Alternatively, a primer may not be used and the film-forming compositions can be applied directly to an adhesion promoter, a pigmented basecoat or other coating. Multiple coating layers such as a primer and optionally a colored base coat may be applied to the substrate prior to application of the curable film-forming composition of the present invention. Thus, the coated article of the present invention may comprise: A) a pigmented, curable film-forming composition applied to at least one surface of the substrate to form a base coated substrate, and B) a transparent, curable film-forming composition applied to at least one surface of the base coated substrate, wherein the transparent, curable film-forming composition is prepared from the curable film-forming composition described above.

After forming a film of the coating on the substrate, the composition can be cured by heating to a temperature and for a time sufficient to cure the composition; for example, by allowing it to stand at ambient temperature (such as a typical room temperature, 72° F. (22.2° C.)), or a combination of ambient temperature cure and baking, or by baking alone. The composition may be cured at ambient temperature typically in a period ranging from about 24 hours to about 36 hours. If ambient temperature and baking are utilized in combination, the composition is often allowed to stand ("flash") for a period of from about 2 minutes to about 120 minutes at a temperature ranging from ambient to 175° F. (79.4° C.), followed by baking at a temperature up to about 300° F. (148.9° C.), usually 285° F. (140.6° C.) for a period of time ranging from about 20 minutes to about 1 hour. For plastic substrates that are heat-sensitive and may deform at high temperatures, the curable film-forming compositions may be curable at temperatures lower than 90° C.

After application of the curable film-forming composition to the substrate and upon curing, the coated article demonstrates a transmission of electromagnetic radiation having any frequency between 22 and 81 GHz in the range of 70% to 100%, such as 75% to 100%, or 80% to 100% measured as demonstrated in the Examples below. The coated article of the present invention additionally demonstrates contaminant mitigation properties as evidenced by radar transmission when subjected to various tests described in the Examples below. Such properties render the curable film-forming compositions of the present invention particularly suitable for use in methods of mitigating contaminant build-up on a substrate, in accordance with the present invention.

In the method of the present invention, contaminant build-up on a substrate is mitigated by applying to at least a portion of the substrate the curable film-forming composition described above and then at least partially curing the curable film-forming composition. A curable film-forming composition is applied to at least one surface of the substrate. A substrate may have one continuous surface, or two or more surfaces such as two opposing surfaces. Typically the surface that is coated is any that is expected to be exposed to conditions conducive to dirt build-up, such as consumer and industrial vehicles and building structures. By "dirt" is meant soil, grease, oil, minerals, detergent, salt, tar, asphalt, animal droppings, insects ("bug splatter"), tree sap, and the like; contaminants that are commonly found outside or in industrial settings, and that tend to adhere to vehicle surfaces. Other contaminants include water and ice. Water in the form of droplets, rivulets, or sheets, and ice on the surface of a substrate may impede the transmission of a signal through the substrate. In a particular example of the present invention, a method of mitigating contaminant build up on a substrate is provided, comprising:

(1) applying a first coating comprising a pigmented, curable film-forming composition to at least a portion of the substrate to form a base coated substrate;

(2) applying a transparent, curable film-forming composition to at least a portion of the base coated substrate formed in step (1) prior to substantially curing the first coating to form a multi-layer coated substrate, wherein the transparent, curable film-forming composition is prepared from the curable film-forming compositions described above; and (3) heating the multi-layer coated substrate formed in step (2) to a temperature and for a time sufficient to cure all the film-forming compositions.

The methods of the present invention are particularly suitable for the mitigation of contaminant build up on a component of a vehicle. Such vehicles may include landcraft such as cars, trucks, sport utility vehicles, motorcycles; watercraft such as boats, ships and submarines; aircraft such as airplanes and helicopters; construction vehicles; and military vehicles, for example tanks and Humvees.

The methods of the present invention are particularly suitable for the mitigation of contaminant build up on a component of an autonomous vehicle. Many vehicles in use today, including autonomous vehicles, utilize transmitters and sensors to send and receive signals for various purposes. It is vital for the continued accurate and safe operation of such vehicles that these signals, which are typically electromagnetic radiation in the form of radio waves, do not get impeded in any way. Coated substrates covering the transmitters and sensors must allow for transmission of the signals therethrough. Mitigating contaminant build up by using the methods of the present invention is particularly beneficial.

Each of the embodiments and characteristics described above, and combinations thereof, may be said to be encompassed by the present invention. For example, the present invention is thus drawn to the following nonlimiting aspects:

1. A coated article comprising:

(1) a substrate that is transparent to electromagnetic radiation having a frequency of 22 to 81 GHz; and (2) a curable film-forming composition applied to at least one surface of the substrate and cured thereon, the curable film-forming composition comprising:

(a) a first film-forming polymer prepared from at least one hydrophobic monomer and having reactive functional groups, wherein the first film-forming polymer (a) is present in the curable film-forming composition in an amount of 20 to 40 percent by weight, based on the total weight of resin solids in the curable film-forming composition;

(b) a second film-forming polymer different from the first film-forming polymer (a) and prepared from at least one hydrophobic monomer, wherein the second film-forming polymer (b) is present in the curable film-forming composition in an amount of 0.5 to 15 percent by weight, based on the total weight of resin solids in the curable film-forming composition; and (c) a curing agent comprising functional groups reactive with the reactive functional groups in (a);

wherein upon application of the curable film-forming composition to a substrate to form a coating layer, the first film-forming polymer (a) is distributed throughout the coating layer, and a concentration of the second film-forming polymer (b) is greater within a surface region of the coating layer than a concentration of the second film-forming polymer (b) within a bulk region of the coating layer; and wherein the coated article demonstrates a transmission of electromagnetic radiation having a frequency of 22 to 81 GHz in the range of 70% to 100%.

2. The coated article according to aspect 1, wherein the second film-forming polymer (b) is more hydrophobic than the first film-forming polymer (a).

3. The coated article according to aspect 1 or 2, wherein the first film-forming polymer (a) comprises an acrylic polymer prepared from a reaction mixture comprising a hydrophobic monomer, wherein the hydrophobic monomer in the reaction mixture used to prepare the first film-forming polymer (a) comprises a fluorinated monomer and/or a siloxane.

4. The coated article according to aspect 3, wherein the hydrophobic monomer in the reaction mixture used to prepare the first film-forming polymer (a) is present in the reaction mixture in an amount of 4 to 15 percent by weight, based on the total weight of monomers in the reaction mixture.

5. The coated article according to any of the preceding aspects, wherein the second film-forming polymer (b) comprises an acrylic polymer prepared from a reaction mixture comprising a hydrophobic monomer and a monomer having a functional group reactive with the functional groups on the curing agent (c), wherein the hydrophobic monomer in the reaction mixture used to prepare the second film-forming polymer (b) comprises a fluorinated monomer and/or a siloxane.

6. The coated article according to aspect 5, wherein hydrophobic monomer in the reaction mixture used to prepare the second film-forming polymer (b) is present in the reaction mixture in an amount of 15 percent by weight to 60 percent by weight, based on the total weight of monomers in the reaction mixture.

7. The coated article according to any of the preceding aspects, wherein the curing agent (c) comprises a polyisocyanate.

8. The coated article according to any of the preceding aspects, wherein the curable film-forming composition further comprises (d) an additional film-forming resin component that (i) is different from the first and second film-forming polymers (a) and (b); and (ii) has functional groups that are reactive with at least one other component of the curable film-forming composition.

9. The coated article according to aspect 8, wherein the additional film-forming resin component (d) comprises an acrylic and/or polyester polyol and an aminoplast.

10. The coated article according to any of the preceding aspects wherein the curable film-forming composition is transparent to visible light.

11. The coated article according to any of the preceding aspects, wherein the substrate comprises plastic and the curable film-forming composition further comprises (d') a saturated fatty acid and (e) a tin catalyst.

12. The coated article according to any of the preceding aspects, wherein the substrate comprises a component of a vehicle.

13. The coated article according to aspect 12, wherein the vehicle comprises an autonomous vehicle.

14. A method of mitigating contaminant build-up on a substrate that is transparent to electromagnetic radiation having a frequency of 22 to 81 GHz, comprising:
(1) applying a curable film-forming composition to at least a portion of the substrate to form a coated substrate, wherein the curable film-forming composition comprises:
(a) a first film-forming polymer prepared from at least one hydrophobic monomer and having reactive functional groups, wherein the first film-forming polymer (a) is present in the curable film-forming composition in an amount of 20 to 40 percent by weight, based on the total weight of resin solids in the curable film-forming composition;
(b) a second film-forming polymer different from the first film-forming polymer (a) and prepared from at least one hydrophobic monomer, wherein the second film-forming polymer (b) is present in the curable film-forming composition in an amount of 0.5 to 15 percent by weight, based on the total weight of resin solids in the curable film-forming composition; and
(c) a curing agent comprising functional groups reactive with the reactive functional groups in (a); and
(2) heating the coated substrate formed in step (1) to cure the film-forming composition.

15. The method of aspect 14, comprising:
(1) applying a first coating comprising a pigmented, curable film-forming composition to at least a portion of the substrate to form a base coated substrate;
(2) applying a transparent, curable film-forming composition to at least a portion of the base coated substrate formed in step (1) prior to substantially curing the first coating to form a multi-layer coated substrate, wherein the transparent, curable film-forming composition comprises:
(a) a first film-forming polymer prepared from at least one hydrophobic monomer and having reactive functional groups, wherein the first film-forming polymer (a) is present in the curable film-forming composition in an amount of 20 to 40 percent by weight, based on the total weight of resin solids in the curable film-forming composition;
(b) a second film-forming polymer different from the first film-forming polymer (a) and prepared from at least one hydrophobic monomer, wherein the second film-forming polymer (b) is present in the curable film-forming composition in an amount of 0.5 to 15 percent by weight, based on the total weight of resin solids in the curable film-forming composition; and
(c) a curing agent comprising functional groups reactive with the reactive functional groups in (a); and
(3) heating the multi-layer coated substrate formed in step (2) to cure all the film-forming compositions.

16. The method od aspect 14 or 15, wherein the film-forming composition is a film-forming composition as defined in any of aspects 1 to 10, 14 or 15 and/or the substrate is a substrate as defined in any of aspects 10 to 13.

The following examples are intended to illustrate various embodiments of the invention, and should not be construed as limiting the invention in any way.

EXAMPLES

The following working examples are intended to further describe the invention. It is understood that the invention described in this specification is not necessarily limited to the examples described in this section.

Example A

A hydrophobic polyol to be used as a first film-forming polymer in the composition of the present invention, containing 4.8 percent by weight PDMS-functional methacrylate monomer, was synthesized by the following procedure. 2331 g amyl acetate was charged into a four-necked round bottom flask fitted with a thermocouple, mechanical stirrer, and condenser and blanketed with $N_2$. The mixture was heated to 150° C. and held for 10 minutes. After that, an initiator mixture of 341 g amyl acetate and 135 g LUPEROX 7M50 (polymerization initiator available from Arkema) was charged into the flask over 4 hours. Simultaneously, a monomer mixture of 407 g butyl methacrylate, 1035 g isobornyl methyacrylate, 635 g 2-hydroxyproyl methacrylate, 574 g hydroxyethyl methacrylate, 453 g butyl acrylate, 195 g KF-2012 silicone fluid available from Shin-Etsu and 87 g amyl acetate was charged into the flask over 3 hours. Directly after charging the above monomer mixture, a second monomer mixture of 136 g butyl methacrylate, 211 g 2-hydroxyproyl methacrylate, 191 g hydroxyethyl methacrylate, 105 g butyl acrylate and 39 g amyl acetate was charged into the flask over 45 minutes. After the initiator mixture charge was complete, the reaction was held at 150° C. for an additional 30 minutes. After that, the system was cooled down to 110° C., and 35 g butyl acrylate was charged into the flask all at once. A mixture of 142 g amyl acetate and 57 g LUPEROX 26 (polymerization initiator available from Arkema) was charged into the flask over 1 hour, followed by holding at 110° C. for 1 hour. The final measured solid content by weight of the above resin is 57.0% with a weight average molecular weight of 6498 g/mol and a number average molecular weight of 2490 g/mol based on gel permeation chromatography using polystyrene standards.

Example B

A hydrophobic polyol to be used as a second film-forming polymer in the composition of the present invention, containing 23.0 percent by weight polydimethylsiloxane (PDMS)-functional methacrylate monomer was synthesized by the following procedure. A mixture of 2404 g amyl acetate, 841 g X-22-2426 (reactive silicone fluid available from Shin-Etsu), 534 g isobornyl methacrylate and 147 g 4-hydroxybutyl acrylate were charged into a four-necked round bottom flask fitted with a thermocouple, mechanical stirrer, and condenser and blanketed with $N_2$. The mixture was heated to 135° C. and held for 10 minutes. After that, an initiator mixture of 641 g amyl acetate and 140 g LUPEROX 7M50 was charged into the flask over 3 hours. Simultaneously, a monomer mixture of 1603 g isobornyl methyacrylate and 444 g 4-hydroxybutyl acrylate was charged into the flask over 3 hours. After that, the reaction was held at 135° C. for an additional 30 minutes. Then, a mixture of 320 g amyl acetate and 32 g LUPEROX 26 was charged into the flask over 1 hour, followed by holding at 135° C. for 1 hour. The final measured solid content by weight of the above resin is 49.4% with a weight average molecular weight of 8300 g/mol and a number average molecular weight of 1100 g/mol based on gel permeation chromatography using polystyrene standards.

Formulation Example

A clear coat layer was applied over thermoplastic polyolefin (TPO) substrates. The coating layers were applied under controlled conditions of 20-22° C. temperature and 60-65% relative humidity using conventional spray equipment (SPRAYMATION, available from Spraymation, Inc). The coating layer was sprayed in two consecutive coats without any intermediate drying between spray applications. The two coating layers of the clear coat system where then allowed to dry for 7 minutes under ambient conditions and thereafter baked at 80° C. for 30 minutes. The film thickness of system after final cure was approximately 50 micrometers.

The clearcoat was prepared by mixing part A and B using the components listed on Table 1.

TABLE 1

| Components | Parts by weight |
|---|---|
| n-Amyl Acetate | 21.0 |
| Diethylene Glycol n-butyl Ether Acetate | 5.0 |
| TINUVIN 928 [1] | 2.0 |
| TINUVIN 292 [2] | 3.2 |
| Melamine[3] | 7.2 |
| Polysiloxane polyol silica [4] | 4.1 |
| Flow/anti-popping additive [5] | 0.05 |
| Acrylic polyol [6] | 17.6 |
| Hydrophobic polyol of Example B | 20.4 |
| Hydrophobic polyol of Example A | 54.1 |
| Saturated fatty acids [7] | 4.0 |
| SOLVESSO 100 [8] * | 9.0 |
| Crosslinker [9] * | 40.0 |
| Dibutyl Tin di-laurate * | 0.15 |

[1] 2-(2H-Benzotriazol-2yl)-6-(1-methyl-1-phenylethyl)-4-(1,1,3,3-tetramethylbutyl)phenol UV absorber available from Ciba Specialty Chemicals Corp.
[2] Hindered amine light stabilizer available from Ciba-Geigy Corp.
[3] Highly butylated melamine (CYMEL ® 1156 available from Allnex)
[4] Silica dispersion prepared as follows: a 4-neck reaction flask equipped for vacuum distillation was flushed with $N_2$. To the reaction flask was added 1051.1 parts-by-weight of a siloxane polyol, 1125.8 parts-by-weight of ORGANOSILICASOL MT-ST-M (colloidal silica from Nissan Chemicals), and 480.3 parts-by-weight of methyl amyl ketone. The resulting mixture was vacuum distilled at 25° C. for 4 hours. The siloxane polyol was prepared beforehand by reacting 131.54 parts-by-weight of trimethylolpropane monoallyl ether and 93.21 parts-by-weight of MASILWAX BASE (a polysiloxane-containing silicon hydride available from BASF Corporation).
[5] Polyacrylate surface additive (BYK-390 by BYK) in butyl acetate.
[6] 14.5 percent by weight BMA; 14.5 percent by weight BA; 20 percent by weight HEMA; 29 percent by weight IBOMA; 22 percent by weight HPMA at 53% weight solids in aromatic hydrocarbon mixture.
[7] Prisorine 3501 available from Croda
[8] Blend of aromatic solvents available from ExxonMobil Corporation.
[9] A mixture of 1.6 parts by weight DESMODUR N-3300A (a 100% solids hexamethylene diisocynate (HDI) trimer (isocyanurate ring) available from Covestro LLC) and 1 part by weight DESMODUR Z 44700 (a 70% solids isophorone diisocyante (IPDI) trimer (isocyanurate ring) avaiable from Covestro LLC).
* Part of a B pack, mixed independently and added to the remaining of the ingredients before application.

The curable film-forming composition above was compared to a Control clearcoat (DC4000 acrylic polyol mixed with DCH 3085 polyisocyanate hardener, both available from PPG). The Control clearcoat was applied over thermoplastic polyolefin (TPO) using an HVLP gravity fed spray gun (SATA jet 4000) with a 12" fan spray and 27 psi at the gun nozzle (1.8 mm opening).

The TPO substrates with applied clearcoats were mounted between electromagnetic radiation transmitter and receiver antennas with the coated side of the substrate facing the transmitter. Water was spray applied to the coated substrates prior to measurement. The insertion loss (IL) was measured and referred to the amount of transmitted signal that was not detected at the receiver. This method assumes a "lossless" condition in which the substrate either does not absorb or absorbs an insignificant amount of the incident radar frequency. The % Transmission was calculated according to Equation 1. Substrates were tested using 24 GHz, which is predominantly short-range radar, and 77 GHz, which is predominantly long-range radar.

$$\% \text{ Transmission} = 100 \times 10^{IL/10} \qquad \text{Equation 1}$$

TABLE 2

Radar testing of clearcoats

| | Insertion loss | | % Transmission | |
|---|---|---|---|---|
| Clearcoat | @ 24 GHz | @ 77 GHz | @ 24 GHz | @ 77 GHz |
| Control with water | −3.53 | −3.22 | 44.4 | 47.6 |
| Control no water - dry | −0.46 | −0.57 | 89.9 | 87.7 |
| Formulation Example with water | −0.46 | −1.23 | 89.9 | 75.3 |

TABLE 2-continued

Radar testing of clearcoats

| Clearcoat | Insertion loss | | % Transmission | |
|---|---|---|---|---|
| | @ 24 GHz | @ 77 GHz | @ 24 GHz | @ 77 GHz |
| Formulation Example no water - dry | −0.26 | −0.73 | 94.2 | 84.5 |

Results collected for both short-range (24 GHz) and long-range (77 GHz) radar indicated that the coated article of the present invention effectively shed water and had significantly reduced insertion loss compared to the Control. This correlated to an improved radar transmission (Table 2). In fact, the % Transmission of the coated article of the present invention with water was very close to the coatings measured when they were dry, indicating a very effective water-shedding capability.

The extended retention of dirt and water build-up mitigation properties of the coated articles of the present invention compared to substrates coated with conventional compositions is due to a more homogenous distribution of hydrophobic material throughout the coating, a property that is not possible with the sole use of traditional additive-type hydrophobic materials that are loaded at low concentrations (<10% final solids).

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A coated article comprising:
   (1) a substrate that is transparent to electromagnetic radiation having a frequency of 22 to 81 GHz; and
   (2) a curable film-forming composition applied to at least one surface of the substrate and cured thereon, the curable film-forming composition comprising:
   (a) a first film-forming polymer having reactive functional groups and prepared from a reaction mixture which comprises a siloxane present in the reaction mixture in an amount of 4 to 15 percent by weight, based on the total weight of monomers in the reaction mixture, wherein the first film-forming polymer (a) is present in the curable film-forming composition in an amount of 20 to 40 percent by weight, based on the total weight of resin solids in the curable film-forming composition;
   (b) a second film-forming polymer different from the first film-forming polymer (a) and prepared from a reaction mixture which comprises at least one hydrophobic monomer comprising a siloxane, wherein the second film-forming polymer (b) is present in the curable film-forming composition in an amount of 0.5 to 15 percent by weight, based on the total weight of resin solids in the curable film-forming composition; and
   (c) a curing agent comprising functional groups reactive with the reactive functional groups in (a);
   wherein upon application of the curable film-forming composition to a substrate to form a coating layer, the first film-forming polymer (a) is distributed throughout the coating layer, and a concentration of the second film-forming polymer (b) is greater within a surface region of the coating layer than a concentration of the second film-forming polymer (b) within a bulk region of the coating layer; and wherein the coated article demonstrates a transmission of electromagnetic radiation having a frequency of 22 to 81 GHz in the range of 70% to 100%.

2. The coated article of claim 1, wherein the second film-forming polymer (b) is more hydrophobic than the first film-forming polymer (a).

3. The coated article of claim 1, wherein the reaction mixture used to prepare the second film-forming polymer (b) further comprises a monomer having a functional group reactive with the functional groups on the curing agent (c).

4. The coated article of claim 3, wherein the hydrophobic monomer in the reaction mixture used to prepare the second film-forming polymer (b) is present in the reaction mixture in an amount of 15 percent by weight to 60 percent by weight, based on the total weight of monomers in the reaction mixture.

5. The coated article of claim 1, wherein the curing agent (c) comprises a polyisocyanate.

6. The coated article of claim 1, wherein the curable film-forming composition further comprises (d) an additional film-forming resin component that (i) is different from the first and second film-forming polymers (a) and (b); and (ii) has functional groups that are reactive with at least one other component of the curable film-forming composition.

7. The coated article of claim 6, wherein the additional film-forming resin component (d) comprises an acrylic and/or polyester polyol and an aminoplast.

8. The coated article of claim 1 wherein the curable film-forming composition is transparent to visible light.

9. The coated article of claim 1, wherein the substrate comprises plastic and the curable film-forming composition further comprises (d') a saturated fatty acid and (e) a tin catalyst.

10. The coated article of claim 1, wherein the substrate comprises a component of a vehicle.

11. The coated article of claim 10, wherein the vehicle comprises an autonomous vehicle.

12. The coated article of claim 10, wherein the reaction mixture used to prepare the second film-forming polymer (b) further comprises a monomer having a functional group reactive with the functional groups on the curing agent (c).

13. A coated vehicle component comprising:
   (1) a substrate that is transparent to electromagnetic radiation having a frequency of 22 to 81 GHz; and
   (2) a curable film-forming composition applied to at least one surface of the substrate and cured thereon, the curable film-forming composition comprising:
   (a) a first film-forming polymer prepared from at least one hydrophobic monomer comprising a siloxane and having reactive functional groups, wherein the first film-forming polymer (a) is present in the curable film-forming composition in an amount of 20 to 40 percent by weight, based on the total weight of resin solids in the curable film-forming composition;
   (b) a second film-forming polymer different from the first film-forming polymer (a) and prepared from at least one hydrophobic monomer comprising a siloxane, wherein the second film-forming polymer (b) is present in the curable film-forming composition in an amount of 0.5 to 15 percent by weight, based on the total weight of resin solids in the curable film-forming composition; and
   (c) a curing agent comprising functional groups reactive with the reactive functional groups in (a);

wherein upon application of the curable film-forming composition to a substrate to form a coating layer, the first film-forming polymer (a) is distributed throughout the coating layer, and a concentration of the second film-forming polymer (b) is greater within a surface region of the coating layer than a concentration of the second film-forming polymer (b) within a bulk region of the coating layer; and wherein the coated article demonstrates a transmission of electromagnetic radiation having a frequency of 22 to 81 GHz in the range of 70% to 100%, wherein the vehicle component comprises at least one of a wheel, bumper, fender, hood, door, and panel.

* * * * *